(12) United States Patent
McLaughlin

(10) Patent No.: US 8,940,958 B2
(45) Date of Patent: Jan. 27, 2015

(54) REMEDIATION COMPOSITION COMPRISING ALUM SLUDGE

(75) Inventor: Michael John McLaughlin, South Australia (AU)

(73) Assignees: Commonwealth Scientific and Industrial Research Organisation, Australian Capital Territory (AU); Ziltek Pty Ltd, Eastwood, South Australia (AU)

( * ) Notice: Subject to any disclaimer, the term of this patent is extended or adjusted under 35 U.S.C. 154(b) by 243 days.

(21) Appl. No.: 13/498,676

(22) PCT Filed: Sep. 30, 2010

(86) PCT No.: PCT/AU2010/001284
§ 371 (c)(1),
(2), (4) Date: May 15, 2012

(87) PCT Pub. No.: WO2011/038459
PCT Pub. Date: Apr. 7, 2011

(65) Prior Publication Data
US 2012/0219519 A1 Aug. 30, 2012

(30) Foreign Application Priority Data
Oct. 1, 2009 (AU) ............................... 2009904805

(51) Int. Cl.
*B09B 3/00* (2006.01)
*C02F 11/00* (2006.01)
(Continued)

(52) U.S. Cl.
CPC ................ *B09B 3/0041* (2013.01); *B09C 1/08* (2013.01); *C02F 11/008* (2013.01); *C02F 1/281* (2013.01); *C02F 1/5236* (2013.01)

USPC ........... 588/315; 588/318; 588/400; 588/405; 588/407; 71/11; 71/12; 210/633; 210/634; 210/679; 210/683; 210/684; 210/688; 405/128.5; 405/128.75; 405/129.25

(58) Field of Classification Search
USPC ........ 588/315, 318, 400, 405, 407; 71/11, 12; 210/633, 634, 679, 683, 684, 688; 258/184; 405/128.75, 129.25, 128.15
See application file for complete search history.

(56) References Cited

U.S. PATENT DOCUMENTS 4,209,335 A 6/1980 Katayama et al.
4,612,404 A 9/1986 Thyagarajan
(Continued)

FOREIGN PATENT DOCUMENTS

JP 52-042469 A 4/1977
JP 07-155400 A 6/1995
(Continued)

OTHER PUBLICATIONS

"Material", Free Merriam-Webster Dictionary [online], [retrieved Jan. 24, 2014] Retrieved from the Internet: <URL: http://www.merriam-webster.com/dictionary/material>.*
(Continued)

*Primary Examiner* — Jane C Oswecki
(74) *Attorney, Agent, or Firm* — Nixon & Vanderhye P.C.

(57) ABSTRACT

Method for the stabilization of contaminants within a material selected from soils, mining tailings and by-products, sludge wastes and industrial wastes, by mixing the material with an alum sludge composition. The composition includes one or more aluminum compound(s) and/or complex(es) together with a reactive carbon material.

15 Claims, 1 Drawing Sheet

Figure 1:
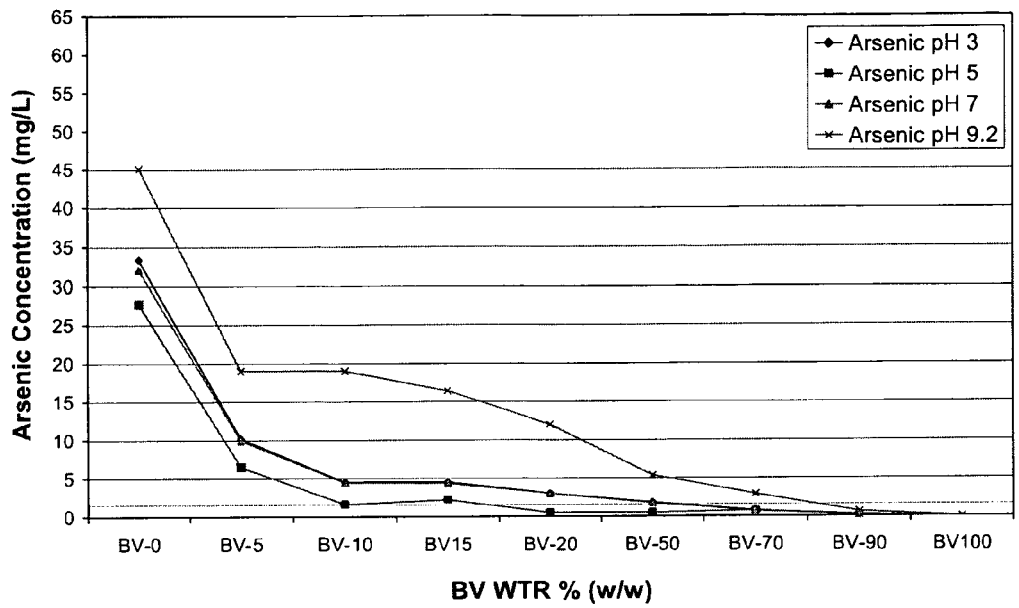

(51) Int. Cl.
  *B09C 1/08* (2006.01)
  *C02F 1/28* (2006.01)
  *C02F 1/52* (2006.01)

(56) References Cited

U.S. PATENT DOCUMENTS

| | | | | |
|---|---|---|---|---|
| 5,275,733 | A * | 1/1994 | Burnham | 210/609 |
| 5,730,918 | A * | 3/1998 | Nikolskaja et al. | 264/119 |
| 5,859,306 | A * | 1/1999 | Stanforth | 588/318 |
| 6,830,695 | B1 * | 12/2004 | Brady et al. | 210/679 |

FOREIGN PATENT DOCUMENTS

| | | |
|---|---|---|
| JP | 07-204605 A | 8/1995 |
| JP | 09-085225 A | 3/1997 |
| JP | 2004-154628 A | 6/2004 |

OTHER PUBLICATIONS

Pandit, M., et al; "Sludge Disposal"; *Water Treatment Primer*; CE 4124; Environmental Information Management Civil Engineering Dept., Virginia Tech; 4 pgs. (2009).

"Alum Recovery at a Drinking Water Treatment Plant", City of Durham, NC; *Pollution Prevention Challenge Grant: Project Summary*, 2 pgs., Dec. 1985.

Examination Report dated Nov. 13, 2012 issued in New Zealand Patent Application No. 599127 (2 pgs).

* cited by examiner

US 8,940,958 B2

REMEDIATION COMPOSITION COMPRISING ALUM SLUDGE

FIELD OF THE INVENTION

The present invention relates to the field of remediation of materials. In particular, the present invention relates to the use of a by-product from drinking water treatment, namely alum sludge, in a method and composition for the stabilisation of contaminants in materials such as soils and other solid or semi-solid matrix types.

INCORPORATION BY REFERENCE

This patent application claims priority from:
Australian Provisional Patent Application No 2009904805 titled "Remediation Composition" filed 1 Oct. 2009.
The entire content of this application is hereby incorporated by reference.

BACKGROUND TO THE INVENTION

During the production of drinking water, "alum" (aluminium sulphate) is typically used to clarify the water. The alum acts by catching fine suspended particles in a gel-like precipitate of aluminium hydroxide. This results in the production of a by-product known as "alum sludge", otherwise known as water treatment sludge or aluminium drinking water treatment residues (Al-WTR), which may be defined as the "accumulated solids or precipitate removed from a sedimentation basin, settling tank, or clarifier in a water treatment plant". The alum sludge must be managed and disposed of by the water treatment plant operator. Presently, most alum sludge is disposed of to landfill, although where the sludge comprises a solids concentration of 25% or less, disposal by way of land application (e.g. to croplands, marginal lands for reclamation, forestry lands or other dedicated sites) is more usual (1). However, these processes can be expensive and, additionally, results in the loss of a potentially valuable material. The recovery of alum from alum sludge has been proposed as one way to reduce the costs (2), however to date, this has not been widely employed. The present applicants herein propose an alternative and novel strategy for "disposing" of alum sludge in a manner which allows the reuse of the aluminium content. That is, the present applicants have surprisingly found that alum sludge may be used, in an unrefined form (i.e. without any particular recovery of the alum), for the stabilisation of contaminants in soils (e.g. soil from former industrial sites being redeveloped for residential or other use) and other solid or semi-solid materials. Some alum sludges also contain a reactive carbon material (e.g. activated carbon which is sometimes used in water treatment processes) and the reactive carbon material may also assist in the stabilisation of contaminants.

SUMMARY OF THE INVENTION

In a first aspect, the present invention provides a method for the stabilisation of contaminants within a material, said method comprising mixing said material with an alum sludge composition, wherein said composition comprises one or more aluminium compound(s) and/or complex(es) together with a reactive carbon material.

In a second aspect, the present invention provides a method for the stabilisation and immobilisation of contaminants within a material, said method comprising mixing said material with an alum sludge composition, wherein said composition comprises one or more aluminium compound(s) and/or complex(es) together with a reactive carbon material, and an amount of a solidifier to form a solid mass from said material.

In a third aspect, the present invention provides a remediation composition comprising one or more aluminium compound(s) and/or complex(es) together with a reactive carbon material.

In a fourth aspect, the present invention provides a method of suppressing odour from a material, said method comprising applying an alum sludge composition to a surface of said material, wherein said composition comprises one or more aluminium compound(s) and/or complex(es) together with a reactive carbon material.

BRIEF DESCRIPTION OF THE ACCOMPANYING FIGURES

Figure 2:
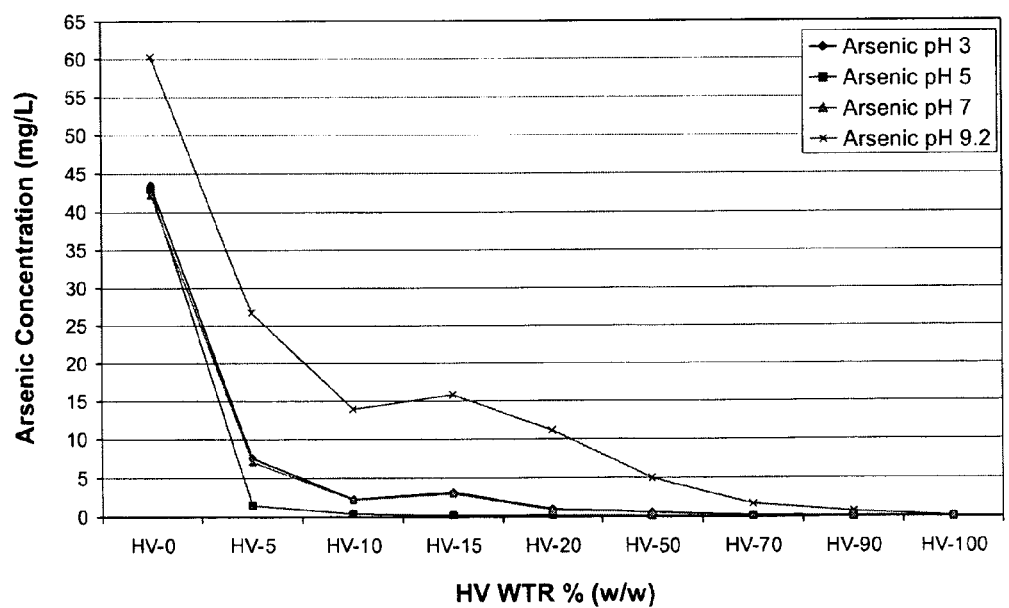

FIG. 1 provides graphical results of the trial described in Example 1 showing the effectiveness of alum sludge from a Barossa Valley, South Australia (BV) water treatment plant in stabilising arsenic in a contaminated soil sample. The graph shows the arsenic concentration (mg/L) leached from the soil following treatment with various Al-WTR treatment compositions under leaching conditions of pH 3, 5, 7 and 9.2 (AS4439.3); and FIG. 2 provides graphical results of the trial described in Example 1 showing the effectiveness of alum sludge from a Happy Valley, South Australia (HV) water treatment plant in stabilising arsenic in a contaminated soil sample. The graph shows the arsenic concentration (mg/L) leached from the soil following treatment with various Al-WTR treatment compositions under leaching conditions of pH 3, 5, 7 and 9.2 (AS4439.3).

DETAILED DESCRIPTION OF THE INVENTION

The present applicants have surprisingly found that a by-product of drinking water treatment, namely alum sludge comprising a reactive carbon material, may be used, in an unrefined form, in a method of remediation of materials such as soils and other solid and semi-solid matrix types contaminated by inorganic and/or organic compounds.

Thus, in a first aspect, the present invention provides a method for the stabilisation of contaminants within a material, said method comprising mixing an alum sludge composition with said material, wherein said composition comprises one or more aluminium compound(s) and/or complex(es) together with a reactive carbon material.

The term "stabilisation" as used herein, refers to a process for the conversion of one or more contaminants to a less soluble, mobile and/or toxic form, thereby resulting in a reduction in the hazard potential of the material. The stabilisation process is also known in the art as "fixation".

Where the stabilisation results in a less soluble or mobile contaminant, the method of the first aspect leads to a reduced level of leachability of that contaminant from the material. In turn, this results in a reduced risk that the material could cause groundwater contamination and/or toxicity to humans or animals contacting the material.

The method of the first aspect may be applied to any contaminated material type, however the method is particularly suitable for application to materials such as soils, mining tailings and by-products, sludge wastes (e.g. effluent treatment sludges) and industrial wastes.

The contaminants that may be stabilised with the method include inorganic contaminants such as metals, metalloids, halogens and nutrients (particularly, one or more of antimony, arsenic, boron, cadmium, chromium, cobalt, copper, cyanide, fluoride, lead, manganese, mercury, molybdenum, nickel, phosphate, selenium, uranium, and zinc) and organic contaminants including, for example, polycyclic aromatic hydrocarbons (PAHs), total petroleum hydrocarbons (TPH), "benzene, toluene, ethylbenzene and xylenes" (BTEX), benzo[a]

pyrene (B(a)P), volatile organic compounds (VOCs), organic pesticides and herbicides, polychlorinated biphenyls (PCBs), fluorinated hydrocarbons such as perfluorooctanylsulfonate (PFOS), dioxins and specific organic compounds such as napthalene, carbon tetrachloride and trichloroethylene. The method and composition may be used for the stabilisation of inorganic contaminants, organic contaminants or the simultaneous stabilisation of inorganic and organic contaminants.

The aluminium compound(s) and/or complex(es) in the composition enables the stabilisation of inorganic contaminants by reacting with and/or adsorbing the inorganic contaminants present, while the reactive carbon material in the composition enables the stabilisation of organic compounds or hydrophobic or uncharged inorganic elements or compounds by adsorbing these contaminants.

The alum sludge composition may be used in an unrefined or substantially unrefined form and, optionally, may contain other additives.

Preferably, the alum sludge composition comprises one or more aluminium compound(s) and/or complex(es) selected from the group consisting of aluminium hydroxide, particularly amorphous aluminium hydroxide, aluminium sulphate and alumina (aluminium oxide) or activated alumina, or combinations thereof.

Most preferably, the alum sludge composition comprises amorphous aluminium hydroxide. While not wishing to be bound by theory, the present applicants believe that alum sludge comprising amorphous aluminium hydroxide is particularly suitable for the stabilisation of contaminants within a material because it possesses a high surface area and surface charge and, therefore, a high adsorptive capacity.

Preferably, the alum sludge composition also comprises a reactive carbon material (i.e. which is used in some water bodies or in treatment processes to improve water quality). However, where the sourced alum sludge composition comprises no reactive carbon material or only a low amount of reactive carbon material, the alum sludge composition may be "fortified" with an amount of added reactive carbon material. Such added reactive carbon material may comprise activated carbon, biochar, charcoal, activated coal or activated charcoal prepared by any of the physical or chemical reactivation processes well known to persons skilled in the art. Preferably, any added reactive carbon material is provided in a powdered or granular form.

Preferably, the amount by weight of the one or more aluminium compound(s) or complex(es) present in the alum sludge composition relative to the amount (by weight) of reactive carbon material is 1:99 to 99:1; the ratio varying depending on, for example, the mix and/or type of contaminants in the material to be treated. More preferably, the amount by weight of the one or more aluminium compound(s) or complex(es) present in the alum sludge composition relative to the amount (by weight) of reactive carbon material is 99:1 to 70:30.

Preferably, the alum sludge composition further comprises an alkaline buffering agent such as calcium carbonate, calcium hydroxide, calcium oxide, magnesium oxide, magnesium hydroxide or any other suitable buffering material that has the ability to buffer the material between about pH 4 and about pH 8, more preferably between about pH 5 and about pH 7. Alternatively, an alkaline buffering agent may be separately mixed with the material.

The mixing of the alum sludge composition into the material may be achieved by simply adding the composition to the material and, thereafter, thoroughly mixing with any suitable means. For example, the mixing may be performed in situ using conventional earth moving equipment such as a back hoe or tiller, or otherwise, the mixing may be performed in a batch-wise ex situ manner using a mechanical mixer such as a cement mixer.

It is beneficial for the material to have a sufficient moisture content to enable the aluminium compound(s) and/or complex(es) within the composition to dissolve and form reaction products with the contaminants and/or readily contact and adsorb the contaminants. Thus, for some applications of the method of the first aspect, it may be desirable to introduce additional water until the mixture of the composition and material is friable or appears as a cement-like slurry.

The method of the present invention is preferably performed in a "low bulking" manner meaning that the volume of the treated material (i.e. consisting of the material plus the alum sludge composition) is, preferably, no more than 15% greater and, more preferably, no more than 5% greater than the volume of the material before the method was performed. Accordingly, the amount of the alum sludge composition that is mixed into the material is, preferably, in the range of about 1% to about 30% w/w of the material. More preferably, the amount of the alum sludge composition that is mixed into the material is about 5% w/w of the material.

Preferably, the method of the first aspect is performed in a manner whereby the composition and contaminants remain in situ (i.e. within the material).

In a particular embodiment, the method of the first aspect is used for the stabilisation of arsenic contamination, wherein the alum sludge composition preferably comprises aluminium hydroxide, particularly amorphous aluminium hydroxide, to adsorb arsenic, and aluminium sulphate to react with arsenic to form insoluble aluminium arsenate. Accordingly, such a composition brings about the stabilisation of arsenic within the material by the combination of arsenic adsorbing on the surface of aluminium hydroxide and precipitation of arsenic as aluminium arsenate. Further, for arsenic stabilisation, the composition may preferably further comprise copper (e.g. present either as a soluble copper, as a slightly soluble copper compound or as adsorbed copper on the alum sludge) which also reacts with arsenic to form insoluble copper arsenate. Copper sulphate is sometimes used to reduce algal activity in water reservoirs, lakes, rivers and dams and, accordingly, may be present in alum sludge sourced from some drinking water treatment plants.

In a second aspect, the present invention provides a method for the stabilisation and immobilisation of contaminants within a material, said method comprising mixing said material with an alum sludge composition, wherein said composition comprises one or more aluminium compound(s) and/or complex(es) together with a reactive carbon material, and an amount of a solidifier to form a solid mass from said material.

Preferably, said method comprises the steps of (i) mixing said material with an alum sludge composition to produce a treated material, wherein said composition comprises one or more aluminium compound(s) and/or complex(es) together with a reactive carbon material, and thereafter (ii) mixing into the treated material an amount of a solidifier to form a solid mass from said treated material.

The term "immobilisation" as used herein, refers to the "solidification" and/or encapsulation of contaminants within a solid mass such as a monolithic solid of high structural integrity so as to reduce the leachability of contaminants, thereby resulting in a reduction in the hazard potential of the material.

In the method of the second aspect, the alum sludge composition, and the preferred features thereof, may be as described above in respect of the first aspect.

The mixing step (i) may be performed, for example, in situ using conventional earth moving equipment, or otherwise in an ex situ manner in batches using a mechanical mixer. Similarly, the mixing step (ii) may be performed with any such suitable means.

Alternatively, the solidifier may be conveniently pre-mixed with the alum sludge composition to allow a single mixing step with the material. Also, in some embodiments, it may be desirable to separately apply the alum sludge composition and the solidifier to the material and, thereafter, mix both into the material through a single mixing step.

The solidifier is preferably selected from binding and hardening materials such as those typically used in the building and construction industry. Particularly preferred solidifiers for use in the method of the second aspect include pozzolanic compounds, magnesium oxide-based solidifiers, clays (e.g. kaolin) and cements, particularly calcium silicate-based cements such as Portland cement, and combinations thereof. The solidifier may also act as an alkaline buffering agent.

In a third aspect, the present invention provides a remediation composition comprising one or more aluminium compound(s) and/or complex(es) together with a reactive carbon material.

Preferably, the remediation composition of the third aspect is an alum sludge composition sourced in an unrefined form from a drinking water treatment plant. However, it is to be understood that the remediation composition may be "synthetic" inasmuch as it may be "assembled" from separate, pure or impure preparations of one or more aluminium compound(s) and/or complex(es) and a reactive carbon material.

Preferably, the amount by weight of the one or more aluminium compound(s) or complex(es) present in the remediation composition relative to the amount (by weight) of reactive carbon material is 1:99 to 99:1. More preferably, the amount by weight of the one or more aluminium compound(s) or complex(es) present in the remediation composition relative to the amount (by weight) of reactive carbon material is 99:1 to 70:30.

Preferably, the remediation composition further comprises an alkaline buffering agent such as calcium carbonate, calcium hydroxide, calcium oxide, magnesium oxide, magnesium hydroxide or any other suitable buffer material that has the ability to buffer between about pH 4 and about pH 8, more preferably between about pH 5 and about pH 7.

The remediation composition may also further comprise copper (e.g. present as a soluble copper, a slightly soluble copper compound, or adsorbed copper).

Finally, the present applicants have realised that alum sludge may also be suitable for odour suppression at sites contaminated with VOCs such as former gasworks sites.

Accordingly, in a fourth aspect, the present invention provides a method of suppressing odour from a material, said method comprising applying an alum sludge composition to a surface of said material, wherein said composition comprises one or more aluminium compound(s) and/or complex(es) together with a reactive carbon material.

The method therefore effectively provides an "odour blanket". The composition may be applied to the surface by any suitable means and, preferably, to provide a covering layer with a depth of about 1 cm to about 20 cm.

The present invention is hereinafter further described by way of the following, non-limiting example(s) and accompanying figure(s).

EXAMPLE(S)

Example 1

Arsenic Stabilisation Trial

Chemical Fixation and Solidification (CFS) is a method particularly suited to treating metals within soils to reduce their leachability. Generally, for arsenic contaminated soil, a CFS method will involve the use of an initial binding or stabilising agent ("binder") before immobilisation in a physical matrix ("solidifier") which may also have a pH buffering capacity. In this trial, the suitability of Al-WTR as an effective binder in such a method was investigated by assessing whether it was capable of reducing the leachability of arsenic under varying pH conditions.

Methods and Materials

The following waste streams and reagents were used:
contaminated soil containing arsenic (As);
Al-WTR from two water treatment plants (Barossa Valley (BV) and Happy Valley High C (HV)) with the characteristic shown in Table 1; and
mains water.

TABLE 1

|    | pH  | Al     | Fe    | P       | Cu   | Pb | Zn |
|----|-----|--------|-------|---------|------|----|----|
|    |     |        |       | (mg/kg) |      |    |    |
| BV | 6.7 | 145553 | 2434  | 311     | 153  | 6  | 5  |
| HV | 7.2 | 127473 | 14891 | 1609    | 9342 | 16 | 51 |

The Happy Valley Al-WTR also contains a reactive carbon material. Carbon content analysis by a standard methodology indicated that the amount of the reactive carbon material present in the HV Al-WTR was about 25% by weight.

The contaminated soil had a total arsenic concentration of 1,000 mg/kg and an arsenic leachability at pH 7 of between 30 and 45 mg/L.

Treatment of the contaminated soil was conducted in 1 L wide-mouth containers. The alum sludge was diluted with the contaminated soil (i.e. 5%, 10%, 15%, 20%, 50%, 70% and 90% w/w). Untreated contaminated soil was used as a control.

The total treatment weight of soil in each container was 1 kg prior to the addition of water/treatment composition. The water/treatment composition was added until a friable consistency was achieved, replicating a full-scale treatment process. The various controls and treatment compositions trialled are set out in Table 2.

The assessment of the capability of the Al-WTR to reduce the leachability of arsenic was conducted following the protocol of the Australian Standard Leaching Procedure (ASLP) AS4439.3 (Standards Australia 1997) at a range of pH values (i.e. 3, 5, 7 and 9.2).

TABLE 2

| Treatment Description | Treatment No | Treatment Code |
|---|---|---|
| Arsenic Soil + BV (0%) (arsenic control) | 1 | BV-0 |
| Arsenic Soil + BV (5%) | 2 | BV-5 |
| Arsenic Soil + BV (10%) | 3 | BV-10 |
| Arsenic Soil + BV (15%) | 4 | BV-15 |
| Arsenic Soil + BV (20%) | 5 | BV-20 |
| Arsenic Soil + BV (50%) | 6 | BV-50 |
| Arsenic Soil + BV (70%) | 7 | BV-70 |
| Arsenic Soil + BV (90%) | 8 | BV-90 |
| Arsenic Soil + BV (100%) (BV control) | 9 | BV-100 |
| Arsenic Soil + HV (0%) (arsenic control) | 10 | HV-0 |
| Arsenic Soil + HV (5%) | 11 | HV-5 |
| Arsenic Soil + HV (10%) | 12 | HV-10 |
| Arsenic Soil + HV (15%) | 13 | HV-15 |
| Arsenic Soil + HV (20%) | 14 | HV-20 |
| Arsenic Soil + HV (50%) | 15 | HV-50 |
| Arsenic Soil + HV (70%) | 16 | HV-70 |
| Arsenic Soil + HV (90%) | 17 | HV-90 |
| Arsenic Soil + HV (100%) (HV control) | 18 | HV-100 |

Results

Leachate analysis at a range of pH values (3, 5, 7 and 9.2) showed that both of the Al-WTR samples were effective in reducing arsenic leachability (see FIGS. 1 and 2). The Al- WTR sourced from the Happy Valley water treatment plant (which included a reactive carbon material) was more effective than that of the Barossa Valley water treatment plant, indicating the beneficial effect of using an alum sludge comprising a reactive carbon material or, otherwise, co-mixing a suitable reactive carbon material with alum sludge.

It was found that the initial arsenic leachate concentrations (no Al-WTR added) for the trial with Barossa Valley Al-WTR, ranged between 28 and 45 mg/L at varying pH levels, but decreased to below 5 mg/L at pH 3, 5 and 7 with a 10% (w/w) addition of Al-WTR. At pH 9.2, the arsenic leachability did not fall below 5 mg/L prior to 50% (w/w) addition of Al-WTR. The post leachate pH levels of each composition used showed that the Barossa Valley Al-WTR did not have an effective buffering capacity.

For the trial with Happy Valley Al-WTR, it was found that the initial arsenic leachate concentrations (no Al-WTR added) ranged between 42 and 60 mg/L at varying pH levels, but decreased to below 5 mg/L at pH 3, 5 and 7 with a 10% (w/w) addition of Al-WTR. At pH 9.2, the arsenic leachability did not fall below 5 mg/L prior to 50% (w/w) addition of Al-WTR. The post leachate pH of each solution used showed that the Happy Valley Al-WTR did not have an effective buffering capacity.

Discussion

Both sources of Al-WTR were effective in reducing the leachability of arsenic at pH 3, 5 and 7 using additions of up to 10% (w/w). However, at pH 9.2 up to 50% (w/w) Al-WTR needed to be added to reduce leachate concentrations to below 5 mg/L. Since this would not be commercially viable, therefore for alkaline contaminated soils at least, it is likely to be necessary to utilise a pH buffer. Conveniently, a pH buffer could be provided by utilising certain solidifiers such as any commercially available magnesia product that is able to act as a pH buffer and keep the treated soil (or other solid matrix) within a neutral pH range.

Example 2

PAH Stabilisation Trial

CFS is a method particularly suited to treating polycyclic aromatic hydrocarbon (PAH) contaminants to reduce their leachability. Generally, for PAH contaminated soil, the CFS method involves the initial adsorption of the organic contaminants (e.g. PAH) onto a suitable material that has a high affinity for organic compounds and a large surface area such as a reactive carbon material ("binder") before immobilisation in a physical matrix such as a pozzolanic compound ("solidifier") which may also have a pH buffering capacity. In this trial, the suitability of the Happy Valley Al-WTR (containing a reactive carbon material) described in Example 1 as an effective binder in such a method was investigated by assessing whether it was capable of reducing the leachability of PAH under varying pH conditions.

Methods and Materials

The trial compared the effect of the Happy Valley Al-WTR as a binder against a commercially available reactive carbon material (Commercial activated carbon (AC)). The Al-WTR was also used in combination with a typical solidifier, namely Portland cement.

Three sub-samples were collected from a single 20 kg batch of soil containing PAH contaminants and analysed by a NATA accredited laboratory for leachable PAHs and Total PAH (AS4439.3). A summary of the analytical results for PAH is shown in Table 3.

TABLE 3

Summary analysis results of contaminated sub-samples for Total PAH (mg/kg), B(a)P (mg/kg), leachable Total PAH (mg/L) and leachable B(a)P (mg/L)

| Contaminant | Sample 1 | Sample 2 | Sample 3 | Average |
|---|---|---|---|---|
| B(a)P (mg/kg) | — | 235 | 192 | 214 |
| Leachable B(a)P (mg/L) | 0.0062 | 0.0151 | 0.0037 | 0.0083 |
| Total PAH (mg/kg) | — | 6213 | 5074 | 5464 |
| Leachable Total PAH (mg/L) | 4.6056 | 4.5482 | 4.1501 | 4.435 |

Twelve treatments were prepared based upon various ratios of binder and solidifier. The treatment compositions were added to 1 kg of contaminated soil and thoroughly mixed prior to the addition of water; this replicates a full-scale mixing process. The treatments are summarised in Table 4.

TABLE 4

| Treatment No | Treatment Description |
|---|---|
| T1 | PAH Soil + HV Al-WTR only (5%) |
| T2 | PAH Soil + Commercial AC only (5%) |
| T3 | PAH Soil + Solidifier only (10%) |
| T4 | PAH Soil + Solidifier only (20%) |
| T5 | PAH Soil + Solidifier (10%) + HV Al-WTR (1%) |
| T6 | PAH Soil + Solidifier (20%) + HV Al-WTR (1%) |
| T7 | PAH Soil + Solidifier (10%) + HV Al-WTR (5%) |
| T8 | PAH Soil + Solidifier (20%) + HV Al-WTR (5%) |
| T9 | PAH Soil + Solidifier (10%) + Commercial AC (1%) |
| T10 | PAH Soil + Solidifier (20%) + Commercial AC (1%) |
| T11 | PAH Soil + Solidifier (10%) + Commercial AC (5%) |
| T12 | PAH Soil + Solidifier (20%) + Commercial AC (5%) |

Results

The treatments were cured for 12 days before samples were prepared for analysis at a NATA accredited laboratory following the protocol of the Australian Standard Leaching Procedure AS4439.3 (3A) (Standards Australia 1997) for PAH at pH 5. A summary of the results is provided in Table 5. The results showed that treatments T6, T8, T9, T10 and T12 were effective. Of these, T6 and T8 contained Al-WTR.

TABLE 5

| Treatment No | B(a)P (mg/L) | Total PAH (mg/L) |
|---|---|---|
| T1 | 0.0013 | 0.0351 |
| T2 | 0.0014 | 0.0457 |
| T3 | 0.0008 | 1.8894 |
| T4 | 0.0006 | 2.2765 |
| T5 | <0.0050 | 2.0211 |
| T6 | <0.0005 | 1.4807 |
| T7 | 0.0017 | 0.0451 |
| T8 | 0.0008 | 0.0304 |
| T9 | <0.0005 | 0.1388 |
| T10 | 0.0008 | 0.0923 |
| T11 | 0.0020 | 0.0562 |
| T12 | 0.0008 | 0.0336 |

Further analysis of T6, T8 and T9 using the Multiple Extraction Procedure (MEP), showed that the T8 and T9 samples also met disposal criteria in South Australia.

Discussion

The PAH contaminated soil was particularly odorous due to the high concentrations of naphthalene. When the Happy Valley Al-WTR was added, the odour quickly subsided indicating that it was effective in binding the shorter chain and odorous PAH such as naphthalene. This finding was also supported by the analytical results, which showed that there were leachable naphthalene concentrations of <10 µg/L (T1). The trial results showed that the Happy Valley Al-WTR in combination with a solidifier was effective in reducing the leachable PAH including B(a)P and Total PAH. Further, it was found that a maximum addition amount of 5% (w/w) is all that may be required in order to achieve an acceptable level of PAH stabilisation.

Example 3

Arsenic and PAH Stabilisation Trial

In this trial, the suitability of the Barossa Valley Al-WTR and Happy Valley Al-WTR described in Example 1 as an effective binder of arsenic and PAHs (i.e. phenanthrene and pyrene) in a CFS method was investigated.

Methods and Materials

In addition to the BV Al-WTR and HV Al-WTR, the following contaminated soils and reagents were used:
synthetic soil containing arsenic (about 1000 mg/kg) (Ar-CON);
synthetic soil containing phenanthrene (about 1000 mg/kg) and pyrene (about 1000 mg/kg) (PAH-SP);
solidifiers (Portland cement (PC), a commercially available magnesia product and a kaolin-based cement product (KaoCem (KC)); and
mains water.

The Al-WTR was added in each treatment in an amount of 5% (w/w), as shown in Table 6. The only variable was the type and amount of solidifier added. The arsenic treatments used BV Al-WTR (which has a low amount of reactive carbon material but a high concentration of aluminium hydroxide), and the PAH treatments used HV Al-WTR (which has a relatively high amount of reactive carbon material). For each treatment, the soil, Al-WTR and solidifier was mixed in clean plastic containers, and water added until a friable consistency was achieved. The containers were weighed, recorded and then incubated at room temperature for 7 days. The total treatment weight in each duplicate was at least 500 g prior to water addition. After the incubation, samples were collected and sent to a NATA accredited laboratory for analysis.

TABLE 6

| Treatment Description | Treatment No | Treatment Code | Soil (w/w) | Al-WTR (w/w) | Solidifier (w/w) |
|---|---|---|---|---|---|
| Arsenic Soil | | | | | |
| Soil + BV + kaolin-based cement product | 1 | BV-KC-10 | 85% | 5% | 10% |
| Soil + BV + kaolin-based cement product | 2 | BV-KC-20 | 75% | 5% | 20% |
| Soil + BV + magnesia product | 3 | BV-DC-10 | 85% | 5% | 10% |
| Soil + BV + Portland Cement | 4 | BV-PC-10 | 85% | 5% | 10% |
| PAH Soil | | | | | |
| Soil + HV + kaolin-based cement product | 5 | HV-KC-10 | 85% | 5% | 10% |
| Soil + HV + kaolin-based cement product | 6 | HV-KC-20 | 75% | 5% | 20% |
| Soil + HV + magnesia product | 7 | HV-DC-10 | 85% | 5% | 10% |
| Soil + HV + Portland Cement | 8 | HV-PC-10 | 85% | 5% | 10% |

Results

A summary of the results are presented in Table 7.
In regard to the arsenic treatment:
All treatments reduced arsenic leachability to varying degrees under both pH leach conditions (pH 5 and 9.2);
The BV Al-WTR with kaolin-based cement product was the most successful treatment, but this was with an addition of 20% (w/w) of the kaolin-based cement product. Other treatments only had additions of 10% (w/w); and
The kaolin-based cement product did not seem to be as effective as Portland cement or calcined magnesium oxide at comparable addition rates.
In regard to the PAH (phenanthrene and pyrene) treatment:
All treatments reduced PAH leachability to varying degrees under both pH leach conditions (pH 5 and 9.2); and
The kaolin-based cement product showed that it outperformed Portland cement and calcined magnesium oxide at comparable addition rates (except for pyrene at pH 9.2).

TABLE 7

Analytical results of untreated contaminated soils and treatments

| Treatment Code | Arsenic (mg/kg) | Arsenic pH 5 (mg/L) | Arsenic pH 9.2 (mg/L) | Phenanthrene (mg/kg) | Pyrene (mg/kg) | Phenanthrene pH 5 (mg/L) | Phenanthrene pH 9.2 (mg/L) | Pyrene pH 5 (mg/L) | Pyrene pH 9.2 (mg/L) | *Copper pH 5 (mg/L) | *Copper pH 9.2 (mg/L) |
|---|---|---|---|---|---|---|---|---|---|---|---|
| Arsenic Soil ||||||||||||
| Ar-CON | 971 | 38.1 | 41.1 | — | — | — | — | — | — | — | — |
| BV-KC-10 | — | 15.6 | 26.5 | — | — | — | — | — | — | — | — |
| BV-KC-20 | — | 7.3 | 13.0 | — | — | — | — | — | — | — | — |
| BV-DC-10 | — | 15.7 | 19.7 | — | — | — | — | — | — | — | — |
| BV-PC-10 | — | 8.8 | 19.8 | — | — | — | — | — | — | — | — |
| PAH Soil ||||||||||||
| PAH-SP | — | — | — | 1,080 | 1,090 | 0.403 | 1.070 | 0.122 | 0.266 | — | — |
| HV-KC-10 | — | — | — | — | — | 0.0086 | 0.0135 | 0.0129 | 0.0291 | 0.1 | 0.7 |
| HV-KC-20 | — | — | — | — | — | 0.0051 | 0.0073 | 0.012 | 0.0102 | 0.2 | 0.5 |
| HV-DC-10 | — | — | — | — | — | 0.0617 | 0.108 | 0.111 | 0.118 | 0.7 | 1.4 |
| HV-PC-10 | — | — | — | — | — | 0.0122 | 0.0233 | 0.0139 | 0.0131 | 0.3 | 0.5 |

*Copper has been included as it is in relatively high concentrations in the Happy Valley (HV) Al-WTR.

Discussion

The results showed that Al-WTR (comprising a reactive carbon material) may be used in a CFS method for the stabilisation and immobilisation of inorganic and organic contaminants simultaneously. In particular, the results showed that a 10 to 100 fold reduction in leachability of the organic contaminants could be achieved (i.e. using HV Al-WTR). Further, it was found that copper leachate concentrations were relatively low for the treatments using the HV Al-WTR composition; well below South Australian landfill disposal guidelines of 10 mg/L. The results also indicated that the use of a kaolin-based "green" cement may be preferred for PAH stabilisation and immobilisation in comparison to arsenic stabilisation.

Example 4

PAH and TPH Stabilisation Trial

In this trial, the suitability of using alum sludge in the remediation of a former water-front industrial site contaminated with PAH and C10-C36 petroleum hydrocarbons (TPH; total petroleum hydrocarbons), was investigated.

Materials and Methods

This trial utilised two Al-WTR compositions denoted as composition "F" and "S+":
F Composition of Happy Valley alum sludge comprising activated carbon
S+ Composition of Happy Valley alum sludge comprising a kaolin-based cement product (low carbon solidifier) (KaoCem)

Composition F was trialled on its own and in combination with Portland cement (PC). A blended composition of the F and S+ compositions was also trialled.

The trial was conducted using sub-samples of a 20 kg batch of soil from the site containing PAH and TPH (C10-C36). The various trialled treatments are shown in the "Treatment" columns of Table 8 below.

Percentage values given are by weight of the sub-sample of soil. Total and Leachable PAH, TPH and benzo[a]pyrene (BaP) were analysed. Leachable PAH, TPH and B(a)P were analysed using a standard toxicity characteristic leaching procedure (TCLP) at pH 5 and ASLP (AS4439.3) at pH 7.

Results

The results are provided in Table 8.

TABLE 8

Summary of treatments and total and teachable results for the PAH, TPH and B(a)P

| Sample | Treatment | Total B(a)P (mg/kg) | Leachable B(a)P (μg/L) TCLP (1) ASLP (2) | Total PAH (mg/kg) | Leachable PAH (μg/L) TCLP (1) ASLP (2) | Total TPH (mg/kg) | Leachable TPH (μg/L) TCLP (1) ASLP (2) |
|---|---|---|---|---|---|---|---|
| UNTR | No treatment | 234 | <1.9<br><1.9 | 6417 | 4934<br>3677 | 23200 | 31800<br>16200 |
| F1 | 5% F | 117 | <3.8<br><3.7 | 3544 | 3473<br>754 | 18400 | 16500<br>5630 |
| F2 | 10% F | 162 | <3.8<br><3.7 | 4185 | 2538<br>814 | 15400 | 14100<br>6910 |
| S + 1 | 10% S+ | 165 | <3.8<br><1.9 | 3948 | 7197<br>8191 | 10900 | 19400<br>44100 |
| S + 2 | 15% S+ | 162 | <3.7<br><1.9 | 3861 | 7826<br>5768 | 17400 | 22800<br>31600 |
| F1/PC1 | 5% F,<br>10% PC | 111 | <3.8<br><3.8 | 3150 | 1537<br>1840 | 19000 | 14700<br>18700 |
| F1/PC2 | 5% F,<br>15% PC | 124 | <3.8<br><3.8 | 3535 | 2700<br>2900 | 15200 | 12200<br>24100 |
| F1/PC3 | 5% F,<br>20% PC | 128 | <3.7<br><3.8 | 3887 | 3579<br>4060 | 19300 | 15900<br>25900 |
| F1/S + 3 | 5% F,<br>20% S+ | 137 | <3.8<br><3.8 | 4297 | 4585<br>3570 | 17000 | 20000<br>17500 |

Discussion

The results show that the addition of 5% (w/w) of the F Composition leads to a reduction in TPH leachability of over 50% based on TCLP analysis, and an over 30% reduction based on ASLP analysis.

The addition of S+ and/or Portland cement are not as effective as the F Composition in reducing TPH leachability.

Total PAH leachability results show that 5%(w/w) addition of the F Composition is effective in reducing leachability. Similar to the TPH results, increasing additions of the F Composition do not lead to proportional reductions in PAH leachability.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

All publications mentioned in this specification are herein incorporated by reference. Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia or elsewhere before the priority date of each claim of this application.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

REFERENCES

1: Pandit M and D Siddharth. Sludge Disposal (www.cee.vt-.edu/ewr/environmental/teach/wtprimer/sldg/sldg.html)
2. Alum recovery at a drinking water treatment plant. City of Durham, N.C. Pollution Prevention Challenge grant: Project Summary (1985).
3. Standards Australia. Australian Standard AS4439.3-1997. Wastes, sediments and contaminated soils. Part 3. Preparation of leachates-Bottle leaching procedure. 1997 edition. Sydney, NSW, Australia: Standards Australia, 1997

The invention claimed is:

1. A method for the stabilisation of contaminants within a material selected from the group consisting of soils, mining tailings and by-products, sludge wastes and industrial wastes, said method comprising mixing said material with an alum sludge composition, wherein said composition comprises one or more aluminium compound(s) and/or complex(es) together with a reactive carbon material.

2. A method for the stabilisation and immobilisation of contaminants within a material selected from the group consisting of soils, mining tailings and by-products, sludge wastes and industrial wastes, said method comprising mixing said material with an alum sludge composition, wherein said composition comprises one or more aluminium compound(s) and/or complex(es) together with a reactive carbon material, and an amount of a solidifier to form a solid mass from said material.

3. The method of claim 2, wherein said method comprises the steps of (i) mixing an alum sludge composition with said material to produce a treated material, wherein said composition comprises one or more aluminium compound(s) and/or complex(es) together with a reactive carbon material, and thereafter (ii) mixing into the treated material an amount of a solidifier to form a solid mass from said treated material.

4. The method of claim 2, wherein the solidifier is selected from the group consisting of magnesium oxide-based solidifiers, clays, cements, and combinations thereof.

5. The method of claim 1, wherein the amount of the alum sludge composition that is mixed into the material is in the range of about 1% to about 30% w/w of the material.

6. The method of claim 1, wherein the material is soil.

7. The method of claim 1, wherein the alum sludge composition is unrefined alum sludge from a drinking water treatment plant.

8. The method of claim 1, wherein the alum sludge composition comprises amorphous aluminium hydroxide.

9. The method of claim 1, wherein the alum sludge composition further comprises copper present as a soluble copper, as a slightly soluble copper compound or as adsorbed copper on the alum sludge.

10. The method of claim 1, wherein the alum sludge composition further comprises an alkaline buffering agent.

11. The method of claim 1, wherein the amount by weight of the one or more aluminium compound(s) or complex(es) present in the alum sludge composition relative to the amount by weight of reactive carbon material is in the range of 99:1 to 70:30.

12. A remediation composition comprising one or more aluminium compound(s) and/or complex(es) together with a reactive carbon material.

13. The composition of claim 12, wherein the alum sludge composition further comprises copper present as a soluble copper, as a slightly soluble copper compound or as adsorbed copper on the alum sludge.

14. The composition of claim 12, wherein the composition further comprises an alkaline buffering agent.

15. The composition of claim 12, wherein the composition comprises an amount by weight of the one or more aluminium compound(s) or complex(es) present in the alum sludge composition relative to the amount by weight of reactive carbon material in the range of 99:1 to 70:30.

* * * * *